June 14, 1932. J. ZUBATY ET AL 1,862,994

HEAT INDICATOR

Filed Sept. 26, 1927

Inventors
Jesse E. Eshbaugh
Joseph Zubaty
By Blackmore, Spencer & Hurd
Attorneys Patented June 14, 1932

1,862,994

UNITED STATES PATENT OFFICE

JOSEPH ZUBATY AND JESSE E. ESHBAUGH, OF FLINT, MICHIGAN, ASSIGNORS TO A C SPARK PLUG COMPANY, OF FLINT, MICHIGAN, A COMPANY OF MICHIGAN

HEAT INDICATOR

Application filed September 26, 1927. Serial No. 222,097.

This invention relates to a heat indicating system and particularly to the gauges thereof and has particular reference to gauges used in connection with heat indicating systems of engines of automotive vehicles.

The gauge of the present invention is of the type which uses a plurality of magnets operating an armature to swing the pointer over a dial to indicate the thermal condition of the water in the engine circulating system. Prior gauges of this type have made use of magnets which are positioned in a fan shape or which radiate from a common center. The present invention differs from prior construction in that the magnets instead of being placed in a fan shape are crossed or placed transversely of each other.

The magnets are of progressively increasing strength and as a magnet of greater strength is energized it will pull the armature away from the weaker magnet and accordingly swing the pointer to a different position on the scale. The pointer is provided with a weight which will swing the pointer to its initial position when all the magnets are de-energized.

A base plate is provided upon which there is mounted the dial and the magnets as well as a pin upon which the shaft which operates the pointer is pivotally mounted. Secured to the shaft at a position parallel to the pointer is the armature which is affected by the energization of the magnet and whose position determines the position of the pointer.

In order to energize the magnets in succession use is made of a heat sensitive element in the shape of a bar composed of a plurality of strips of metal secured together and having different coefficients of expansion, so that when heat is applied thereto the end of the bar will bend and close an electric circuit. A further heating of the bar will cause an increased amount of deflection and close a second circuit. This second circuit will energize a stronger magnet and will swing the pointer away from the first magnet and indicate the danger temperature of the water in the circulating system.

The invention is disclosed on the accompanying drawing in which

Figure 1:
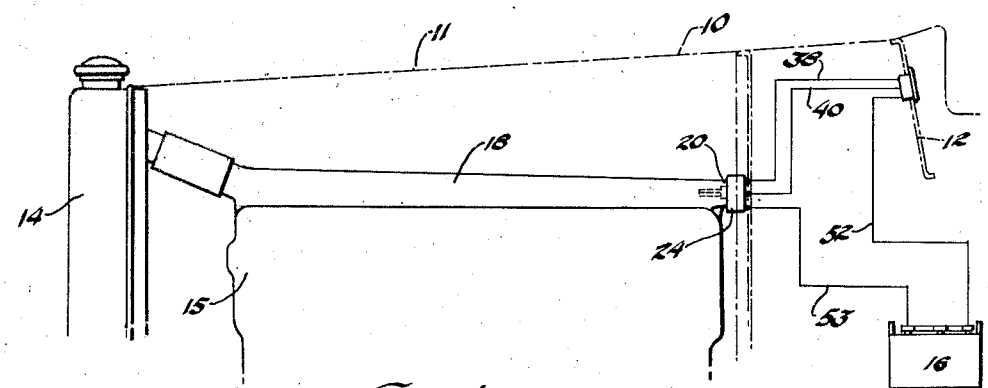
Figure 1 shows a more or less diagrammatic application of the gauge to a heat indicating system of an internal combustion engine.

Referring to the numbered parts on the drawing 10 indicates an automotive vehicle as a whole, 11 the hood thereof, 12 the instrument board, 14 the radiator, 15 the engine, 16 the battery, and 18 the water circulating system.

Figure 2:
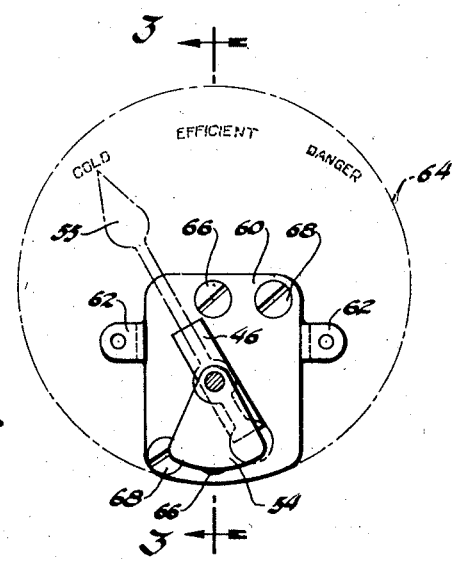
Figure 2 is a front view of the base plate of the gauge with the dial and pointer shown in dotted outline, the casing being removed for the purpose of clearer illustration.

A base plate 60 is used for the purpose of mounting the assembly. The plate has ears 62 extending forwardly and to which the dial 64 is secured. A weight 54 is secured to a shaft 56 pivotally mounted on a pin 58 secured on the plate 60. The weight will normally hold the pointer 55 in the position shown in Figure 2 when the magnets are de-energized. The shaft 56 has a bore 57 in one end for the reception of the pin 58. On the opposite side of the plate 60 there is secured in crossed relation by means of the screws 66 and 68 the magnets 44 and 50 respectively. The armature 46 and its associated shaft and pointer are held in position on the pin 58 by the attraction of the magnets 44 and 50 for the armature.

Secured in the water circulating system at 20 is a heat sensitive element 22 enclosed within a housing 24. The heat sensitive element 22 is in the form of a bar composed of separate strips of metal 26 and 28 secured together and having different coefficients of expansion. One end 30 of the bar is rigidly secured while the opposite end 32 is free. As the heat in the water circulating system rises it will be transmitted to the bar 22 and due to the difference in the coefficients of expansion of the metals 26 and 28 will cause the bar 22 to bend toward the contacts 34 and 36 successively closing the circuits 38 and 40. The circuit 38 will first be closed and send the current through the windings 42 of the relatively weak electro-magnet 44 energizing the magnet and causing the armature 46 to swing from the position shown in Figure 2 to parallelism with the core of the magnet 44. A further rise in the temperature of the water will cause a further bending of the end 32 of the bar 22 and bring about a closing of the contact at 36 and the circuit 40 thereby causing the current to flow through the windings 48 of the relatively strong electro-magnet 50. The electro-magnet 50 has a strength considerably greater than that of magnet 44 and will accordingly pull the armature 46 away from the magnet 44 and into parallelism with the magnet 50. This will swing the pointer to the extreme or danger position indicated in Figure 2. Both magnets 44 and 50 have a common connection 52 leading to the battery 16, and a connection 53 leads from the battery to the end 30 of the bar 22.

Figure 3:
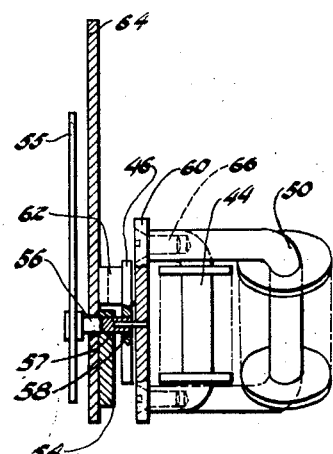
Figure 3 is a section on the line 3—3 of Figure 2.
Figure 4:
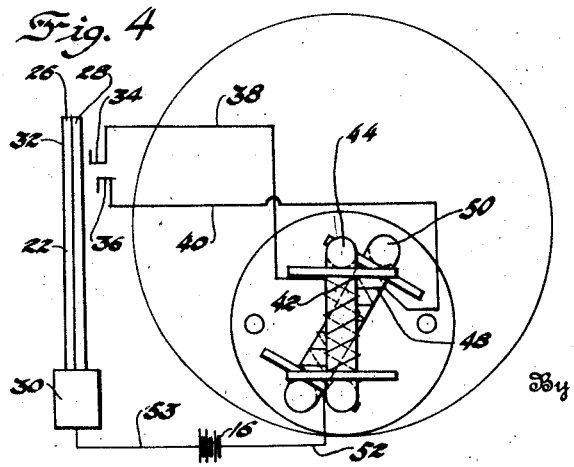
Figure 4 is a diagrammatic application of the heat sensitive element to the gauge showing the manner of making the contacts to energize the magnets.

By referring to Figures 3 and 4 it will be noted that the magnets 44 and 50 instead of being positioned in a fan shape as in prior constructions are crossed or placed transversely to each other. It has been found in actual practice that this crossing of magnets gives much better results than the prior fan shape type of assembly.

In practice we prefer to use but two magnets and allow the weight 54 to return the pointer to normal position. However, if desired, three or more magnets may be used in accordance with the number of positions it is desired that the pointer shall indicate. As disclosed in the drawing, the pointer will show but three positions, the initial or cold position, the efficient or position determined by the magnet 44, and the danger position as determined by the energizing of magnet 50.

We claim:

1. In a gage, a dial, a base plate, a pointer mounted on a shaft journalled in said dial, an armature secured to said shaft, and a plurality of U-shaped electro-magnets mounted at the legs of the U on said plate and adapted to swing said armature and pointer, said magnets positioned in relative crossed relation and having different degrees of energization for the same current, the weaker of said magnets operating on said armature to swing said pointer from one of its extreme positions.

2. In a gage, a dial, a base plate, a pointer mounted on a shaft journalled in said dial, an armature secured to said shaft, and a plurality of U-shaped electro magnets mounted at the legs of the U on said plate and adapted to swing said armature and pointer, said magnets positioned in relative crossed relation and having different degrees of energization, the weaker magnet being positioned nearer the armature, the weaker of said magnets operating on said armature to swing said pointer from one of its extreme positions.

3. In an indicator, a base plate, a dial secured to and spaced from said plate, a turnably mounted shaft, an armature secured to said shaft between said plate and dial, a pointer secured to said shaft, and a plurality of relatively crossed U-shaped magnets secured to the plate at the legs of the U for controlling the position of the armature and pointer.

4. In a gage, a pivoted pointer mounted in said gage, a base plate, a plurality of relatively crossed magnets mounted on said plate adjacent said pointer for establishing its position, the pivotal axis of said pointer corresponding substantially to the intersection of said magnets, said magnets extending on both sides of the pivotal axis of the pointer.

5. In an electrical measuring instrument, a pointer having an armature rigidly mounted relative thereto, means for pivotally mounting the pointer, and a plurality of U-shaped relatively crossed magnets secured to said mounting means and having the connecting member of the U at right angles to the axis of the pointer, said magnets being of different strength, the weaker of said magnets acting on the armature to swing the pointer from one of its extreme positions toward the stronger magnet.

6. In an electrical measuring instrument, a pointer having an armature rigidly mounted relative thereto, means for pivotally mounting the pointer, and a plurality of U-shaped relatively crossed magnets secured to said mounting means and having the connecting member of the U at right angles to the axis of the pointer, said magnets being of different strength and having the ends of their legs in substantially the same plane closely adjacent the armature, the weaker of said magnets acting on the armature to swing the pointer from one of its extreme positions toward the stronger magnet.

7. In an electrical measuring instrument, a pointer having an armature rigidly mounted relative thereto, means for pivotally mounting the pointer, and a plurality of U-shaped relatively crossed magnets having the connecting member of the U at right angles to the axis of the pointer and the legs of the U parallel to the axis of the pointer, the ends of the legs of the magnets terminating in substantially the same plane and closely adjacent the armature.

8. In a gauge, a pointer, an armature movable with said pointer, a plurality of relatively crossed magnets for determining the position of said pointer, said magnets being of progressively increasing strength for the same amount of current whereby the energization of a stronger magnet will swing the pointer and armature from the weaker magnet, said weaker magnet acting on the armature to swing the pointer toward the stronger magnet from one of its extreme positions.

9. In a gauge, a pointer, a plurality of magnets having different degrees of energization for the same current for determining the position of said pointer, the weaker of said magnets acting on the armature to pull the pointer from one of its extreme positions, said magnets being of progressively increasing strength whereby the energization of a stronger magnet will swing the pointer from the weaker magnet, and means to return said pointer to starting position when said magnets are de-energized.

In testimony whereof we affix our signatures.

JOSEPH ZUBATY.
JESSE E. ESHBAUGH.